United States Patent [19]

Logie

[11] Patent Number: 4,677,743

[45] Date of Patent: Jul. 7, 1987

[54] WINDING METHOD

[75] Inventor: Frank M. Logie, London, England

[73] Assignee: Lucas Industries public limited company, Birmingham, England

[21] Appl. No.: 868,619

[22] Filed: May 29, 1986

[30] Foreign Application Priority Data

Jun. 18, 1985 [GB] United Kingdom ................ 8515352

[51] Int. Cl.[4] ........................................ H02K 15/02

[52] U.S. Cl. .................................. 29/596; 29/605; 310/27; 310/42; 335/279; 242/7.03

[58] Field of Search ................ 29/605, 596; 140/92.1, 140/92.2; 310/27, 42, 216, 264, 180, 184, 179, 206; 335/279, 261; 242/7.03, 1.1

[56] References Cited

U.S. PATENT DOCUMENTS 3,636,990 1/1972 Eminger et al. .................... 29/605

3,724,515 4/1973 Eminger ........................... 29/605

4,238,699 12/1980 Seilly ............................... 335/266

4,326,139 4/1982 Mowbray ........................... 310/27

4,553,121 11/1985 Logie ............................... 335/281

4,635,865 1/1987 Arnold .............................. 242/7.11

*Primary Examiner*—Percy W. Echols

*Attorney, Agent, or Firm*—Balogh, Osann, Kramer, Dvorak, Genova & Traub

[57] ABSTRACT

A winding method for winding the coils of a stator structure which has one or more intermediate coils and a pair of end coils having a reduced number of turns. The coil or coils may be directly connected to supply terminals and the coils are connected in series. The method involves using a dummy connector to form a connection point between the two end coils, all the coils being wound from a single length of wire with the dummy connector forming the start and finish point for the winding operation.

2 Claims, 6 Drawing Figures

WINDING METHOD

Figure 1:
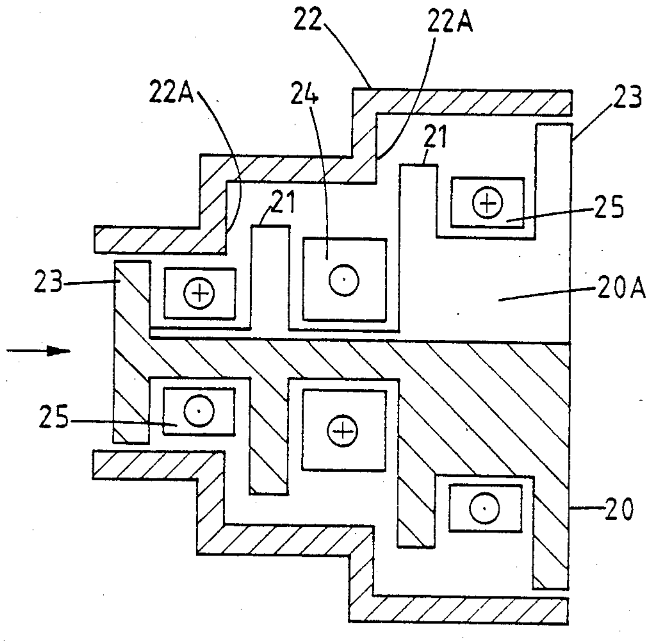

This invention relates to a method of winding the coils of a stator structure of an electromagnetic device of the kind in which the stator structure is of cylindrical form and defines a plurality of axially spaced circumferential pole pieces, adjacent pole pieces defining a groove therebetween, the coils being located in the grooves respectively and in use being supplied with electric current by way of a pair of supply terminals at one end of the stator structure.

A device of the aforesaid kind is described in British specification No. 2036453. As described the coils are connected in series and the winding of all the coils can be achieved using a single length of wire. In this case since the electrical connections are to be made to terminals at one end of the stator structure longitudinal slots are formed in the pole pieces, the slots accommodating the interconnections between adjacent coils. The coils are wound in turn with the winding direction of one coil being opposite to that of the adjacent coil or coils so that adjacent pole pieces assume opposite magnetic polarity.

In some instances it is required that the coils should be connected in parallel. In this case the furthest coil from the terminals will be wound first followed by the adjacent coil and so on. In this case the aforesaid slots will extend into a slot formed in the base walls of the grooves which is wide enough or deep enough to accommodate the end connections of each coil, the coils can be wound in the same or in the opposite direction, providing the end turns are connected correctly to the terminals.

An electromagnetic device of the aforesaid type has been devised and is shown in British specification No. 2140214A in which the end coils of the stator structure have approximately half the number of turns of the intermediate coils. In the case where all the coils are connected in series, the winding of the stator structure can be achieved in the same manner as described. In the case however where the coils are connected in parallel across the supply terminals, the two end coils must be connected in series with each other before being connected to the supply terminals and this poses problems since the winding of the coils must take place in sequence. In another case where a series/parallel connection system has to be employed the two end coils are again connected in series with each other and with one or more of the intermediate coils across the supply terminals with the remaining intermediate coils connected in one or more series combinations across the supply terminals.

The object of the invention is to provide a method of winding the coils of a stator structure of the aforesaid type and in which the end coils of the stator structure are connected in series with each other.

According to the invention a method of winding a stator structure of the kind specified in which the end coils have a reduced number of turns and are connected in series with each other, comprises providing a dummy connector terminal at said one end of the stator structure, connecting the wire to be used in winding the coils to said dummy connector terminal, laying the wire in a slot extending along the stator structure, winding the end coil further from said one end of the stator structure and returning the wire to one of the supply terminals, directly or by way of an intermediate coil, winding the remaining intermediate coils starting with the one further from said one end of the stator structure and winding the end coil at or nearest said one end of the stator structure, one end of said end coil being connected to said dummy connector terminal.

Figure 2:
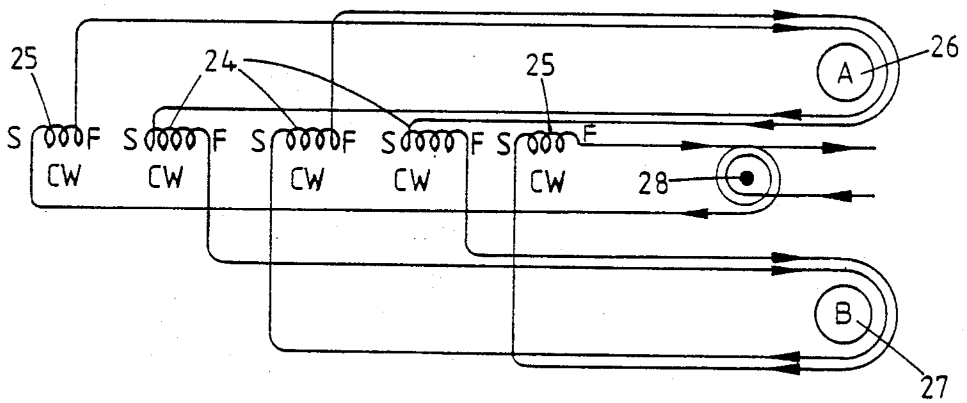
Figure 3:
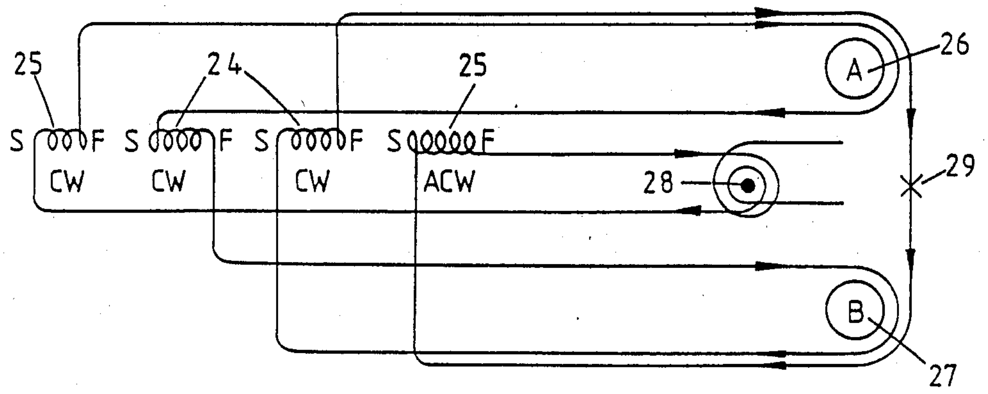
Figure 4:
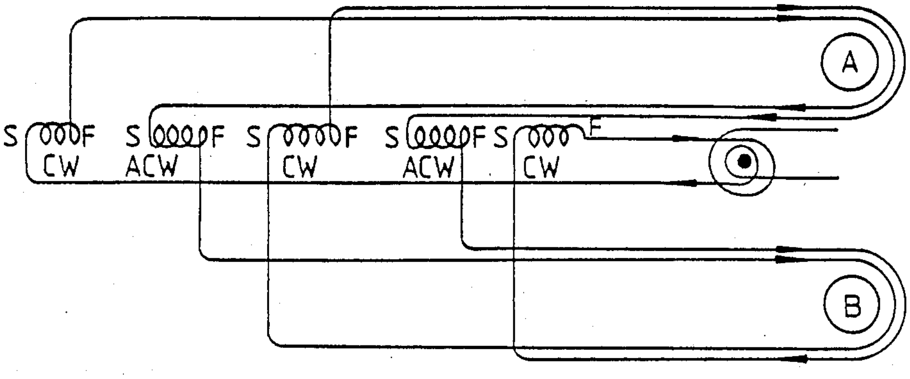
Figure 5:
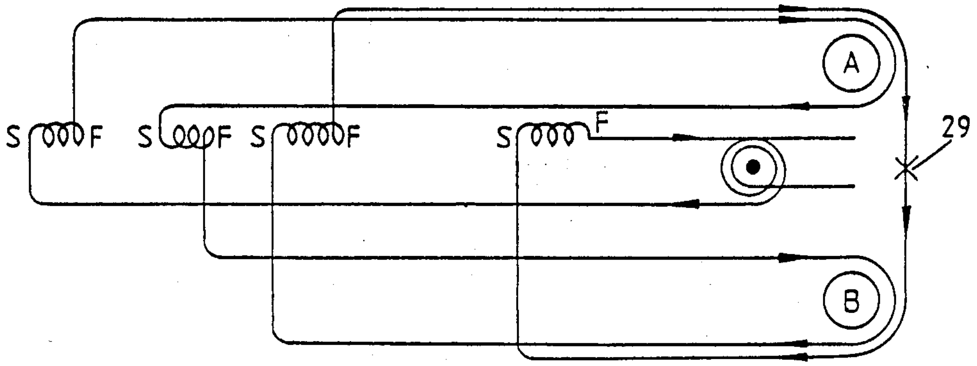
Figure 6:
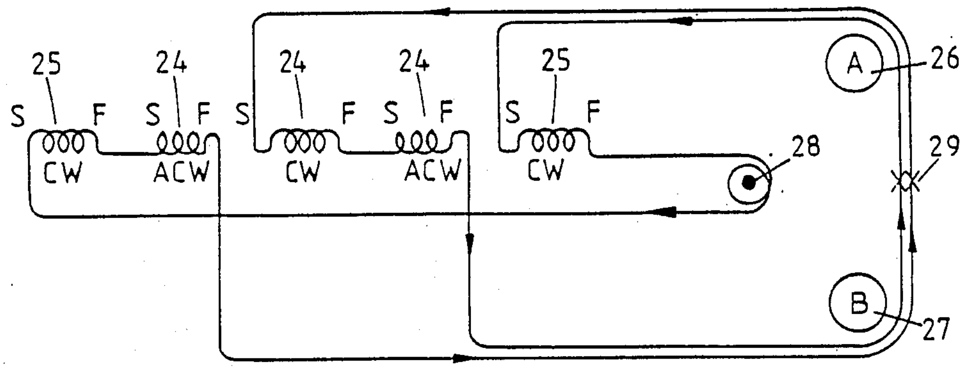

The winding method in accordance with the invention will now be described with reference to the accompanying drawings in which:

FIG. 1 is a sectional side elevation of one example of an electromagnetic device the coils of which can be wound utilising the method of the invention, FIG. 2 shows one winding sequence for use when the electromagnetic device has an odd number of coils, FIG. 3 is a diagram similar to FIG. 2 but showing the winding sequence when the device has an even number of coils, FIGS. 4 and 5 show alternative winding sequences for a device, and FIG. 6 shows another winding sequence for a device employing series/parallel connections.

Referring to FIG. 1 of the drawings the electromagnetic device comprises a stator structure 20 which is of generally cylindrical form and which defines a plurality of intermediate axially spaced annular pole pieces 21. The pole pieces 21 increase in diameter towards one end of the stator structure and between them define a groove. The stator structure also includes a pair of end pole pieces 23 between which and the adjacent pole piece 21 are defined a further pair of grooves. The groove or grooves defined between adjacent pole pieces 21 are provided with coils 24 and the grooves defined between the pole pieces 23 and the pole pieces 21 accommodate coils 25 respectively.

The electromagnetic device also includes an armature 22 which is of stepped form and which defines surfaces 22A which extend in a radial direction and which are presented to the side surfaces of the pole pieces 21. The armature also has plain cylindrical portions between which and the pole pieces 23, are formed radial air gaps. When current flows in the coil 24, the adjacent pole pieces 21 assume opposite magnetic polarity and an attraction force will be developed tending to move the armature axially. The coils 25 also contribute to the flux flowing in the adjacent pole piece 21, the return of flux generated by the coils 25 being by way of the pole pieces 23. The version of the device shown in FIG. 1 is the simplest form of the device and has only two pole pieces 21 and therefore one coil 24. A more complex device would have a greater number of pole pieces 21 with the armature defining complementary pole faces 22A but the stator structure would have only two pole pieces 23. The number of turns of the coils 25 is substantially half the number of turns of the coil or coils 24 and if the coils are connected in series, there is no difficulty in winding the stator structure.

In some instances it is preferable to connect the coils in parallel but the end coils must be connected in series in view of the reduced number of turns.

Referring to FIG. 2 this shows a winding diagram of a device having three coils 24 and of course two coils 25. The problem with winding such a device with a continuous length of wire, is arranging for the series connection between the coils 25. The supply terminals 26, 27 are situated at one end of the stator structure and in order to assist the winding a dummy connector terminal 28 is provided at the same end of the stator structure, it being appreciated that the terminals 26, 27 and 28 are insulated from the stator structure and from each other.

FIG. 2 shows the winding route of an electromagnetic device which has an odd number of coils and the winding starts by first wrapping an end of the wire around the dummy connector terminal 28. The wire is then laid in a slot 20A which extends axially in the stator structure and the winding of the coil 25 furthest from the one end of the stator structure takes place. The starts and finishes of the coils are indicated in the diagram by the letters S and F respectively and the letters CW below each coil indicate one direction of winding, the letters ACW in FIG. 3 indicating the opposite direction of winding. When the winding of the coil 25 furthest from the one end of the stator structure is completed, the wire is returned to the supply terminal 26 and it is then returned along the slot to permit the next adjacent coil 24 to be wound. The end of this coil is returned to the supply terminal 27 and the winding of the next adjacent coil 24 then takes place. This procedure is repeated until the coils 24 have been wound, the end of the last coil 24 being returned to the supply terminal 27 and then returned along the slot to permit winding of the coil 25 nearest the one end of the stator structure. The end of this coil is returned to the dummy connector terminal 28. Using the aforesaid winding route all the coils are wound in the same direction but when current is supplied to the supply terminals 26, 27 the current flow in adjacent coils is opposite so that adjacent pole pieces assume opposite magnetic polarity and the device can function as described. It will be seen that the dummy connector terminal 28 serves as an anchor point in the series connection between the two end coils and it enables the winding of the stator structure to be effected using a single length of wire.

Turning now to FIG. 3, there is shown the winding route for an electromagnetic device having an even number of coils and the initial winding method is as described with reference to FIG. 2. When completing the winding of the last coil 24 the wire is returned to the supply terminal 26 but since the coil 25 must have its end connected to the terminal 27, the wire is then taken around the terminal 27 and the coil 25 nearest to the one end of the stator structure is then wound. The direction of winding however must be reversed. The end of this coil is taken to the dummy connector terminal 28 and the direct connection between the terminals 26 and 27 is severed as indicated at 29. When the supply terminals of the device wound as described with reference to FIG. 3, are connected to a source of supply, adjacent pole pieces again assume opposite magnetic polarity and the device functions as described.

In some examples of the device it is not necessary to ensure that adjacent pole pieces have opposite magnetic polarity and in this case the winding routes shown in FIGS. 4 and 5 are adopted. The winding route shown in FIG. 4 corresponds to that of FIG. 2 with changes in the direction of winding of adjacent coils and the winding route shown in FIG. 5 corresponds to that of FIG. 3 again with appropriate changes in the direction of winding of some of the coils.

In the example shown in FIG. 6 a series/parallel connection is employed. The two end coils 25 are connected in series with one of the intermediate coils 24 across the supply terminals 26, 27 and the two remaining intermediate coils 24 are also connected in series across the supply terminals. The use of the series/parallel connection may be dictated by the supply voltage and wire size.

Using the winding routes described the coils of the stator structure can be wound using a single length of wire.

I claim:

1. A method of winding the coils of a stator structure of an electromagnetic device of the kind in which the stator structure is of cylindrical form and defines a plurality of axially spaced circumferential pole pieces, adjacent pole pieces defining a groove therebetween and grooves, the coils being located in the grooves respectively and connected to a pair of electric supply terminals at one end of the stator structure, the end coils having a reduced number of turns and being connected in series with each other, the method comprising providing a dummy connector terminal at said one end of the stator structure, connecting the wire to be used in winding the coils to said dummy connector terminal, laying the wire in a slot extending longitudinally along the stator structure, winding the end coil further from said one end of the stator structure and returning the wire to one of the supply terminals directly or by way of an intermediate coil, then winding the remaining intermediate coils starting with the one furthest from said one end of the stator structure and then winding the end coil at or nearest said nearest one end of the stator structure, one end of said end coil being connected to said dummy connector terminal.

2. A method according to claim 1 in which the stator structure carries an even number of coils and prior to winding the end coil adjacent said one end of the stator structure the wire is looped around the supply terminals, the portion of the wire connecting said supply terminals subsequently being severed.

* * * * *